Nov. 17, 1970  R. N. LAHDE  3,541,407
DC MOTOR
Filed Aug. 12, 1964
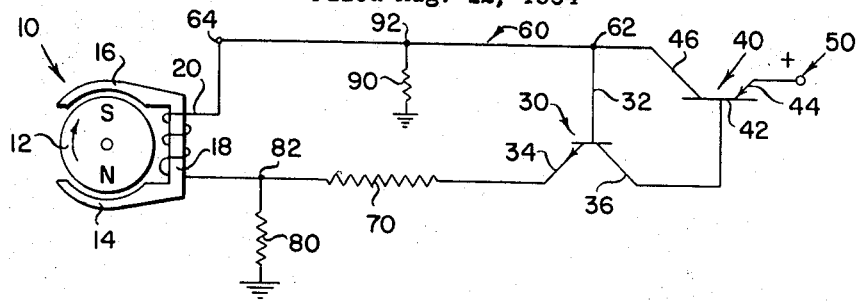
*Fig. 1*
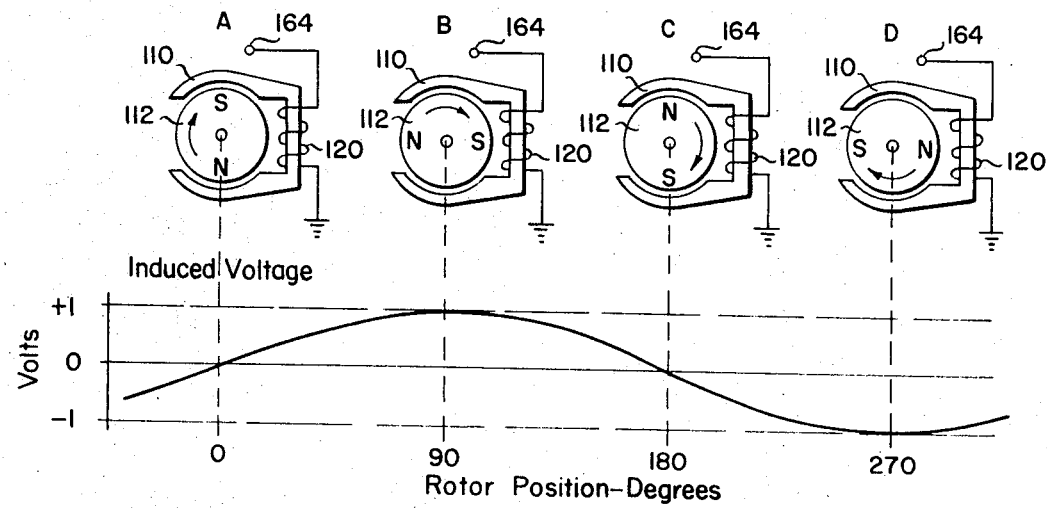
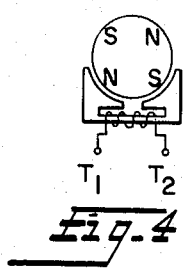
*Fig. 4*
*Fig. 3*
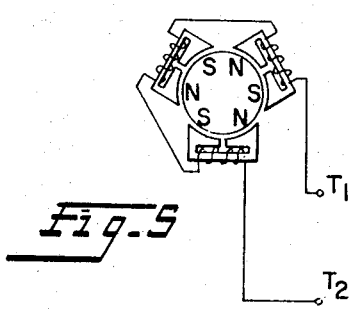
*Fig. 5*
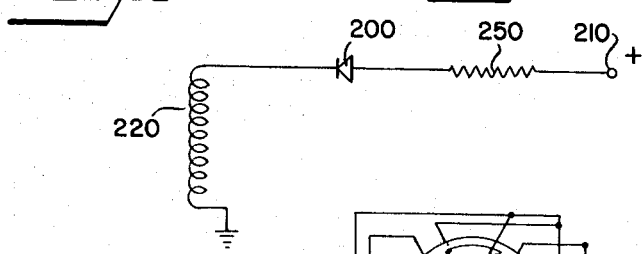
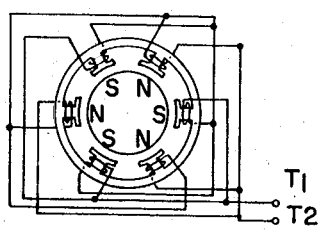
*Fig. 6*
INVENTOR.
Reinhard N. Lahde
BY
George C. Sullivan
AGENT United States Patent Office 3,541,407
Patented Nov. 17, 1970

3,541,407
DC MOTOR
Reinhard N. Lahde, Tarzana, Calif., assignor to Lockheed Aircraft Corporation, Burbank, Calif.
Continuation-in-part of application Ser. No. 78,676, Dec. 27, 1960. This application Aug. 12, 1964, Ser. No. 389,118
Int. Cl. H02k 29/00
U.S. Cl. 318—138                                    13 Claims

ABSTRACT OF THE DISCLOSURE

A simple direct current motor is provided employing a solid-state control circuit incorporating a negative-resistance element which makes it possible to dispense with a conventional commutator, make-or-break contacts or other electro-mechanical means usually employed in conjunction with the motor armature. The motor has a single two-terminal field coil which serves both as a pickup to sense the position of the rotor, as well as a power coil to provide the torque for driving the rotor.

---

The present invention relates to a direct-circuit motor, and more particularly to a more simplified type of motor which has fewer components than heretofore possible. This application is a continuation-in-part of my co-pending application Ser. No. 78,676, filed Dec. 27, 1960 and now abandoned.

One of the principal types of such motor is that employing a transistor control circuit in which a sensitive pickup coil is used to control the direct current supplied to the coil of the motor. An example of such a motor is shown in the patent to Cluwen, 2,986,684, wherein a field of power coil is used to drive the motor, and a second coil, serving as a pickup control coil are used in conjunction with a transistor amplifying circuit.

The above mentioned Cluwen device is typical of the general devices used, and is of the same general type as the present invention. However, the present invention represents a substantial improvement over such direct-current motors, in that it is possible to eliminate the need for the second or pickup coil.

Accordingly, it is a general object of this invention to provide a direct-current motor of simplified design in which a commutator is not needed.

It is a further object of my invention to provide a direct-current motor having transistors in the field-winding circuits which perform the commutating function.

It is a further object of this invention to provide a direct-current motor of great simplicity, wherein a single coil is used an a minimum of circuitry is required to provide for the commutating function.

It is still another object of this invention to provide a direct-current motor wherein only a single coil is used, and having a transistorized amplifier circuit connected thereto which makes it possible for the single coil to act both as a power coil and a pickup coil.

It is still another object of the present invention to provide a simple direct-current commutatorless motor requiring no switching in the circuitry thereof.

It is still another object of this invention to provide for a direct-current electric motor in which no electro-mechanical means which engage the rotor are used.

It is another object of this invention to provide a commutatorless direct current motor which has a multiplicity of poles.

It is still a further object of this invention to provide a direct-current motor which permits the motor structure to be used in a physically separated place from the control and power circuitry associated therewith.

It is still another object of this invention to provide a direct-current motor which can be miniaturized to a very high degree.

It is still a further object of this invention to provide a direct-current motor having a minimum of connection leads.

A still further object of the invention is to provide a direct-current motor which will be less expensive to produce than previously used motor units.

These, and other objects and advantages of my invention will be better understood when taken with reference to the following specification and claims, taken with the drawings.

Referring particularly to the drawing, FIG. 1 shows the general circuit arrangement of my invention.

FIG. 2 shows an illustrative arrangement of the field and armature pieces in various positions, and the voltage induced in the coil at such positions.

FIG. 3 shows the arrangement which could be employed if a tunnel diode were used as part of the control circuitry.

FIGS. 4, 5, and 6 show other arrangements of the stator and rotor assembly using a multiplicity of poles.

Referring more particularly to the drawings, FIG. 1 shows the motor assembly generally indicated at 10 having a rotor 12 with north and south poles as indicated which rotates within a soft iron frame having pole faces 14 and 16 of induced opposite polarity, and a connecting piece 18 around which coil 20 is wound.

The circuit shown is essentially a balanced amplifier circuit which performs a switching function through transistors 30 and 40.

A direct current power supply having positive voltage is connected to the circuit at point 50.

The current passes in series through transistor 40 and coil 20 which are connected by line 60, the amount of current passing through transistor 40 being controlled by transistor 30.

A delicate balance for controlling the conductivity or nonconductivity through transistor 40 is maintained by the relative values of resistors 70 and 80 in conjunction with the resistance of coil 20. The balance of these circuit elements is such that a voltage disturbance in coil 20 will act to upset the balance so that transistor 40 would either be conducting or nonconducting.

Basically, this is done by the rotor 12, itself, and by the effect that the north and south poles thereof have upon coil 20 when they rotate past. Voltage is induced in coil 20 and this acts to upset the delicate balance of the circuit established by the resistance of circuit elements 20, 70 and 80. The voltage change is also reflected at the base 32 of transistor 30 which acts to effect current flow between emitter 34 and collector 36 of transistor 30 to thereby vary the voltage on base 42 of transistor 40, which in turn will vary current flow through transistor 40 between emitter 44 and collector 46.

The function of resistor 80 is to balance the impedance of the circuit with respect to the coil 20 when the circuit is fully conducting. Resistor 90 is used to lower the voltage level of junction 62 relative to the voltage at junction 82 to provide an automatic cut-off when the motor is not running.

Referring to FIG. 2, wherein four positions of a rotor 112 having north and south poles are shown with respect to a coil 120 of a motor assembly 110. Four different positions, A, B, C, and D are illustrated together with the effect that these positions will have upon the voltage induced into the coil in the four successive stages of rotation. It will be noted that assuming a voltage of plus or minus one volt being induced in the coil at various rotational stages, an approximately sinusoidal induced voltage is produced at the top of coil 110. This effect is used to control balance and unbalance of the circuit shown in FIG. 1.

Referring specifically to the structure shown in the four different positions in FIG. 2, frame 110 is made of soft magnetic material, and surrounds rotor 112 which has at opposite ends thereof a north and south pole. The rotor 112 is rotating in a clockwise direction, and passes adjacent to a coil 120, the lower most end of coil 120 is grounded, and the top of the coil has a terminal 164.

The voltage which appears at terminal 164 is shown diagrammatically immediately below each of the figures. It will be noted that it is approximately sinusoidal in shape, and for purposes of illustration the voltage is assumed to go from a plus one volt to a minus one volt in the four rotational positions of the rotor.

Positions A and C show the rotor with the poles lined up evenly with respect to the frame, in which case no voltage will appear across the coil 120. This is illustrated in the voltage diagram at positions A and C wherein the induced voltage is shown to be zero.

However, at position B where the rotor position is indicated at 90 degrees and the south pole passes coil 120 in a clockwise travel direction wherein a miximum rate of change of flux is experienced by the coil inducing therein a maximum voltage which will produce an assumed positive voltage of one volt at terminal 164.

Conversely, when the north pole of the rotor turns to position D so that the north pole passes immediately adjacent coil 120, a maximum negative voltage, herein assumed to be one volt, will appear at terminal 164.

This voltage differential as applied to the circuit shown in FIG. 1 is used to control the commutator-switching action necessary for the running of the motor. The induced voltage is used to change the voltage at the base of transistor 30 which will then thereby effect the current which flows through transistor 40, which, in turn, is directly connected in series with coil 120 and the direct current power supply.

In order to determine the critical values of the components in the circuit, a simplified analysis, which is found to agree with the empirical results was used, and is as follows:

Assuming that the voltage difference between the base and the emitter of both transistors is assumed to be very small compared to the collector-emitter voltage, and that the base current of transistor 30 is neglected as compared to the collector current of transistor 40, and also assuming that both transistors are assumed to have a constant amplification factor which is assumed to be large and on the order of twenty five or more, the following analysis can be made:

1. The collector current equals the amplification (beta) factor times the base current, and with the emitter current equaling the base current plus the collector current, and substituting, the emitter current will equal the amplification factor plus one multiplied by the collector current divided by the amplification factor. Solving for the collector current, we find that it equals beta over one plus beta multiplied by the emitter current $$\left(i_{\text{c}} = \frac{\beta}{1+\beta} \cdot i_{\text{e}}\right)$$

2. To analyze the action of the circuit, we first assume the supply voltage V to be applied at terminal 50. It is applied to the emitter of transistor 40, and we also assume that the voltage of the collector 46 is at a lower potential, represented by K·V where the constant K is a number smaller than unity. The resistor 20 is disregarded at this point since it is not essential for operation. Its function is explained at a later point. The voltage at collector 46 which is also the voltage at junction 62 and base 32, is, with the above-mentioned assumption that the voltage between the base and emitter of the transistors is negligibly small, equal to the voltage of emitter 34 of transistor 30.

With no induced voltage present, then the voltage at terminal 82 can be computed by network formula as follows:

$$E_{82} = \frac{\frac{KV}{R_{18}} + \frac{KV}{R_{70}}}{\frac{1}{R_{18}} + \frac{1}{R_{80}} + \frac{1}{R_{70}}} = KV \frac{R_{18} + R_{70}}{R_{18} + R_{70} + \frac{R_{18} + R_{70}}{R_{80}}}$$

or, if we substitute:

$$\frac{R_{18} + R_{70}}{R_{18} + R_{70} + \frac{R_{20} R_{70}}{R_{80}}} = A(R), \therefore E_{82} = KV \cdot A(R)$$

The constant $A(R)$ is smaller than unity and depends upon resistor levels in the circuit.

We can now compute the current $i$ in the resistor 70, which is the emitter current of transistor 30:

$$i_{70} = \frac{KV - KVA(R)}{R_{70}} = \frac{KV}{R_{70}}[1 - A(R)]$$

The base current of transistor 40, which is the collector current of transistor 30 is only a small amount less than the emitter current of transistor 30, and can be expressed as follows:

$$i_{42} = \frac{\beta_{30}}{1+\beta_{30}} \cdot i_{70} = \frac{KV}{R_{70}}[1 - A(R)]\frac{\beta_{30}}{1+\beta_{30}}$$

Further, knowing the value of the voltage at terminal 82, we can also compute the current $i_{20}$ thru the motor coil, when assuming the inductive voltage in the coil to be zero, so that we get the following relation:

$$i_{20} = \frac{KV - KV \cdot A(R)}{R_{18}} = \frac{KV}{R_{18}}[1 - A(R)]$$

The ratio of the base current of the transistor 40 with respect to its collector current can now be expressed as follows:

$$\frac{i_{42}}{i_{40}} = \frac{KV[1-A \cdot R]R_{18}}{R_{70} \cdot KV[1-A(R)]} \cdot \frac{\beta_{30}}{1+\beta_{30}} = \frac{R_{18}}{R_{70}} \cdot \frac{\beta_{30}}{1+\beta_{30}} = \frac{1}{\beta_{40}}$$

If $\beta_{14}$ is large:

$$\beta = \frac{R_{70}}{R_{18}}$$

The formula shows that this ratio appears to be independent of the assumed supply voltage and the assumed voltage multiplication factor, K. This illustrates that the resistors in the network must be arranged in accordance with the expression set forth for the ratio of the base current to the collector current of transistor 40 in order to satisfy that equation, and if this is done, the equation will apply for any values of the supply voltage and for any assumed voltage drop across the two transistors. The condition prevailing will be one of sensitive equilibrium of the circuit wherein any disturbance such as a slight change of resistance values or gain factors in the transistors will result in the circuit becoming either fully conductive or cutting off. This can also be applied to any disturbance which is introduced in the coil by means of the induced voltage motor, and this is the critical factor in the invention as set forth, and makes the circuit operate as desired so that an automatic commutating function is obtained without additional circuit elements.

If we refer to FIG. 1, it will be evident that a positive voltage which appears at the terminal 64 just above the motor coil such as produced with position B of the rotor as shown in FIG. 2 would unbalance the circuit so that a fully conductive condition would be created in transistor 40 because the positive voltage at terminal 62, or base 32 of NPN transistor 30 would make that transistor conductive and since the collector current of transistor 30 is the base current of transistor 40.

It will be noted that the current going through the motor coil because of the conducting condition of the circuit will tend to generate a north pole at the lower pole face 14, and a south pole at the pole face 16. With the north pole of the rotor 12 at the left, and the rotor rotating clockwise, this polarity would tend to accelerate the motor.

The operation of the motor through one full rotation is as follows:

Assuming, that the poles of the rotor are lined up initially with the stationary poles of the structures, such that the south pole of the rotor is in the upper position, as indicated in position A of FIG. 2, no inductive voltage is produced because the magnetic flux would pass directly through the soft magnetic material and the rate of change of the flux through the coil would momentarily be zero. With the resistance values chosen as above indicated, the circuit would be in equilibrium for any level of current.

As the rotor moves clockwise from position A to position B of FIG. 2 the south pole moves into position right near the coil. As the south pole passes through this second position, a positive inductive voltage is generated in the motor coil, causing a disturbance in the circuit which will make the circuit conductive. This will cause a current through the coil which generates a south pole at pole face 16, and a north pole at pole face 14. This produces an accelerating torque on the rotor, tending to assist its rotation in a clockwise direction.

The south pole of the rotor moves down to the position shown at C of FIG. 2. During the entire half-cycle of the rotation of the rotor mentioned to this point, the inductive voltage is positive, and therefore the circuit was conducting, and the motor accelerating.

As the south pole of the rotor moves towards position D of FIG. 2, negative inductive voltages are generated which disturb the equilibrium of the circuit in the opposite direction. The negative inductive voltage will tend to produce a negative potential at the base 32 of transistor 30, which, in turn, will make that transistor and hence also transistor 40 nonconductive. This means that the circuit will remain nonconducting during this half cycle, while the south pole moves up toward pole face 16. The absence of a current in the circuit will mean that the south pole of the rotor will move forward the pole face 16 with little or no deceleration. Since there will be an accelerating torque on the first half of the cycle tending to turn the rotor in a clockwise direction, and no equal braking torque imparted on the rotor in the second half of the cycle, there will be a net accelerating torque in the clockwise direction. This will result in the unit operating as a motor due to the excess of accelerating torque in the clockwise direction.

The assumptions made with regard to the transistors hold with reasonable accuracy for many existing transistors, as long as the collector current or the collector-base potential does not become too small. In other words they hold as long as the transistor operating point is not too close to either complete cut-off or complete conductivity.

Practically, neither the cut-off state nor the conductive state will be one hundred percent perfect, but, with a reasonable level of supply voltage, the states can be approached to a degree providing a high electro-mechanical efficiency of the motor.

It should be noted that the value of resistor 90 is large and is on the same order of magnitude as resistor 70 so that a small additional negative potential is applied to the base 32 of transistor 30 to thereby facilitate cut-off of the circuit when the motor is at standstill. This eliminates the need for a switch.

FIG. 3 shows an alternative arrangement in which a tunnel diode is used in place of the transistor circuit described in FIG. 1.

The tunnel diode 200 is connected in series with the motor coil 220, and has a resistance 250 connected between the diode 200 and the positive terminal 210.

The characteristic of the diode 200 is such that a portion of the operating region has a negative resistance, so that an increase in voltage applied will decrease the current, and conversely, a decrease in voltage applied will increase the current.

If the diode is connected so that when no inductive voltage is present in the coil, the diode operating point is within the negative resistance region, for a given voltage level, an inductive voltage generated in the coil tending to lower the total driving voltage in the circuit will result in the negative resistance of the diode causing the current to increase instead of decreasing, so that the same result as described above, namely, a surge of current through the coil which will act upon the rotor in the first half cycle of the operation to cause an acceleration thereon.

Conversely, during the last half cycle of rotor movement, the inductive voltage will be negative, thereby increasing the total voltage across the diode to decrease current flow therethrough, so that an action similar to that in the circuit of FIG. 1 for the last half cycle of the rotor rotation is obtained with the consequent small decelerating action on the rotor.

Although this circuit is simpler than that shown in FIG. 1, it is less efficient because the circuit of FIG. 1 gives nearly a complete on-off switching action with respect to the power coil current, while the diode arrangement results in only a change in current flow which is not nearly so abrupt.

It should also be noted that there are numerous other ways of achieving the desired switching action to operate the motor in accordance with the present invention for example, such as using vacuum tubes sensitive relays, or other devices.

It is also possible to use this invention with a reverse current arrangement during the second half cycle, so that an accelerating torque is acting on the rotor during both cycles of operation.

It is also possible to use this invention to drive a mechanical oscillator such as would be obtained, for example, by restraining the rotor shown in FIGS. 1 and 2 with a centering spring which tends to center the rotor in the position B or D of FIG. 2. This arrangement permits the rotor to oscillate around the center position and the action of the circuit in accordance with this invention tends to maintain this oscillation.

FIGS. 4, 5 and 6 show modifications of the rotor and stator assemblies wherein a plurality of poles are used. This is also an important feature of the invention since the application of the concept of the invention is not limited to a simple two-pole motor.

In each of the modifications shown in these figures, junctions $T_1$ and $T_2$ would be connected to a circuit similar to that shown in FIG. 1 at points 64 and 82 respectively. The stator coils can be connected in series as shown in FIG. 5, or, as shown in FIG. 6 there can be a direct connection of the separate coils to one of the terminals. In FIG. 6, for example, junction $T_1$ is connected directly to three of the poles of the stator, while junction $T_2$ is directly connected to the remaining three poles of the stator.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention

Having thus described my invention what I claim is:

1. A direct current motor comprising, a rotor of magnetic material which has a north and a south pole, a frame of soft permeable magnetic material within which said rotor is mounted and which has two pole faces immediately adjacent the peripheral arc of rotation of said rotor north and south poles, said pole faces being connected by an intermediate section which is also disposed adjacent the peripheral arc of rotation of the rotor poles, a combination power-pickup coil which is disposed about said intermediate section and has a first terminal at one end thereof and a second terminal at the other end thereof, a source of direct current, and circuit means connected to said first and second coil terminals and to said source of direct current to supply current to said combination power-pickup coil, via said first and second terminals, and to receive an induced voltage from said coil, via said first and second terminals, in response to movement of said rotor adjacent thereto.

2. A direct current motor as set forth in claim 1 wherein said circuit means is maintained in a state of balanced equilibrium between conducting and nonconducting states, the equilibrium of said circuit means being affected by voltage induced in said combinaton power-pickup coil.

3. A direct current motor as set forth in claim 1 wherein said circuit means includes an element which performs a switching function.

4. A direct current motor as set forth in claim 2 wherein said circuit means includes a transistor which is connected in series with said coil and is controlled by a circuit to make it either conductive or nonconductive depending upon the voltage induced in said combination power-pickup coil.

5. A direct current motor having a rotor comprised of a permanent magnet, a pole-piece having two pole faces adjacent opposite sides of the rotor, a two-terminal coil wound around the pole-piece, means to apply a direct current voltage potential through the coil via the two terminals thereof, means to increase the voltage in the coil when the induced voltage appearing at said two terminals and caused by the rotating rotor subtracts from the applied coil voltage, and means to decrease the applied voltage in the coil when the voltage induced by the rotating rotor adds to the coil voltage.

6. A direct current motor having a rotor comprised of a permanent magnet, a pole-piece having two pole faces facing the rotor on opposite sides thereof, a coil having two terminals wound around the pole-piece, means to connect the collector of a transistor to one terminal of the coil, a voltage means to connect the first polarity of the voltage source to the emitter of the transistor, means to connect the base of the transistor to the collector of a second transistor, means to connect the base of the second transistor to the collector of the first transistor, means to connect the emitter of the second transistor through a resistor to the second terminal of the coil, means to connect the second terminal of the coil through a resistor to the opposite polarity of the voltage source.

7. A direct current motor having a rotor comprised of a permanent magnet, a pole-piece having pole faces on opposite sides of the rotor closely adjacent thereto, a coil wound around the pole-piece having first and second terminals, a direct current voltage source, means to connect the first polarity of the voltage source to the emitter of a first transistor, means to connect the collector of the first transistor to the first terminal of the coil, means to connect the base of the first transistor to the collector of a second transistor, means to connect the base of the second transistor to the collector of the first transistor, means to connect the emitter of the second transistor through a resistor to the second terminal of the coil, means to connect the second terminal of the coil through a resistor to the second polarity of the direct current voltage source, means to connect the first terminal of the coil through a resistor of larger value than the aforementioned resistor to the second polarity of the direct current voltage source.

8. A direct current motor having a rotor comprised of a permanent magnet, a pole-piece having two pole faces facing the rotor on opposite sides thereof, a coil having two terminals wound around the pole-piece, means to connect the collector of a PNP transistor to one terminal of the coil, means to connect a positive voltage to the emitter of the PNP transistor, means to connect the base of the PNP transistor to the collector of an NPN transistor, means to connect the base of the NPN transistor to the collector of the PNP transistor, means to connect the emitter of the NPN transistor through a resistor to the second terminal of the coil, means to connect the second terminal of the coil through a resistor to ground.

9. A direct current motor having a rotor comprised of a permanent magnet, a pole-piece having pole faces on opposite sides of the rotor closely adjacent thereto, a coil wound around the pole-piece having first and second terminals, a positive voltage source, means to connect the positive voltage source to the emitter of a PNP transistor, means to connect the collector of a PNP transistor to the first terminal of the coil, means to connect the base of the PNP transistor to the collector of an NPN transistor, means to connect the base of the NPN transistor to the collector of the PNP transistor, means to connect the emitter of the NPN transistor through a resistor to the second terminal of the coil, means to connect the second terminal of the coil through a resistor to ground, and means to connect the first terminal of the coil through a resistor of larger valve to ground.

10. A direct current motor, comprising a rotor of permanent magnetic material having a plurality of poles, a plurality of pole-pieces having two pole faces, a two terminal combination power and pickup coil wound around each of said pole pieces, said coils being series connected, means to apply a direct current voltage potential through the series connected coils, means to increase the voltage in the coils when the induced voltage caused by the rotating rotor subtracts from the voltage applied to said coils, and means to decrease the applied voltage in the coils when the voltage induced by the rotating rotor adds to the voltage in said coils.

11. A direct current motor comprising, a rotor of magnetic material which has a plurality of north and south poles, a plurality of soft permeable magnetic material pole pieces adjacent the peripheral arc of rotation of said rotor, said pole pieces each having a two-terminal combination power and pickup coil associated therewith, a source of direct current, circuit means connected to the two terminals of each of said coils and to said source of direct current to supply current to said coils in response to movement of said rotor, the coils associated with alternately spaced pole-pieces being connected directly to a positive terminal of said circuit means, and the coils associated with the remaining pole-pieces being directly connected to the negative terminal of said circuit, said circuit means beng maintained in a state of balanced equilibrium between conducting and non-conducting states, the equilibrium of said circuit means being affected by voltage induced in said coils from rotor movement.

12. Electromechanical apparatus comprising,
a source of a magnetic field,
inductive means,
means for supporting said magnetic field source and said inductive means to permit relative continuously rotating movement therebetween which rotating relative movement induces an induced electrical signal provided by said inductive means, said means for supporting being fixed with respect to said inductive means, a device having a negative resistance characteristic,
a source of electrical energy,
means including said device for intercoupling said electrical energy source and said inductive means,
and said source of electrical energy establishing a static bias upon said device so that said induced electrical signal combines with said static bias to cause said device to operate dynamically upon said negative resistance characteristic and coact with said electrical energy source to sustain relative continuously rotating movement between said inductive means and said magnetic field source.

13. Electromechanical apparatus in accordance with claim 12 wherein said means for intercoupling said electrical energy source and said inductive means continuously establishes a path for the flow of energy therebetween.

References Cited

UNITED STATES PATENTS

| | | | |
|---|---|---|---|
| 2,986,684 | 5/1961 | Cluwen | 318—254 XR |
| 3,136,935 | 6/1964 | Hogan et al. | 318—254 XR |
| 3,241,018 | 3/1966 | Stockman | 318—138 |

FOREIGN PATENTS 926,511    5/1963    Great Britain.

GLEN R. SIMMONS, Primary Examiner

U.S. Cl. X.R.

318—254, 345